United States Patent Office 2,797,189
Patented June 25, 1957

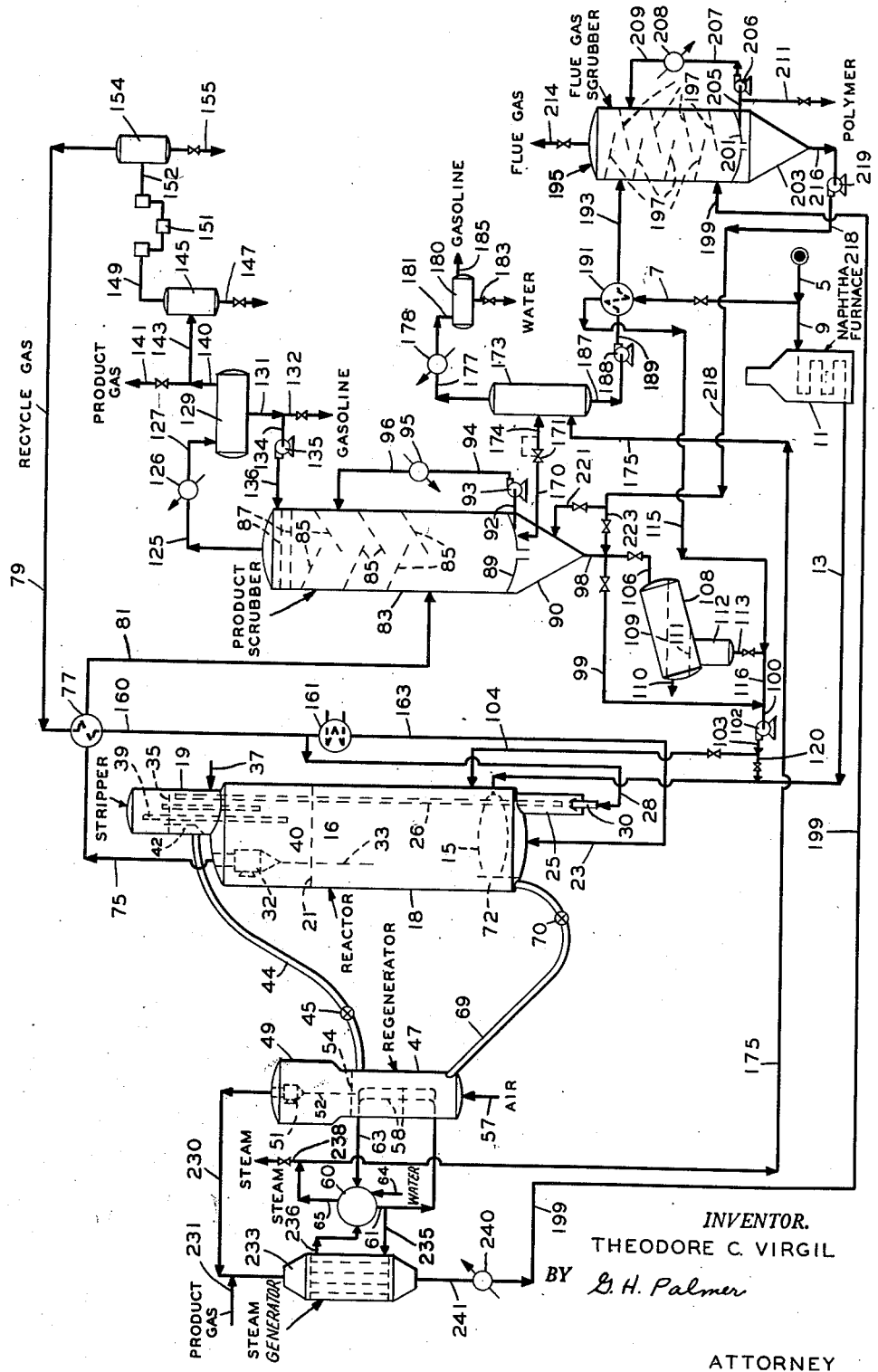

2,797,189

RECOVERY OF FINES IN A HYDROCARBON CONVERSION PROCESS

Theodore C. Virgil, Basking Ridge, N. J., assignor to The M. W. Kellogg Company, Jersey City, N. J., a corporation of Delaware Application April 24, 1953, Serial No. 350,835

4 Claims. (Cl. 196—50)

This invention relates to an improved method for recovering entrained finely divided solids from gasiform streams, and more particularly, it pertains to a method for recovering finely divided reforming catalyst which is entrained in the product streams from the reaction and regeneration zones of a reforming system.

At present, there is lacking a satisfactory method by which entrained fines in the regenerator and reactor effluents of a hydroforming system are recovered. The quantity of entrained fines is sufficient to justify rather expensive means for this purpose, consequently, effort is being made to improve the techniques acquired from the operations of other fluid systems. Since the purpose of a hydroforming process is to produce large quantities of gasoline of high anti-knock value, it is essential to operate with as little loss of gasoline as is possible by being careful in the separation and recovery of the same from the total reaction product. The recovery of catalyst is related to gasoline production insofar as the two constitute components of the reactor effluent, and undergo treatments for separate recoveries. From the standpoint of economy, it is desirable to combine the various separation treatments with little or no use of extraneous processing materials except for apparatus and the like. The present invention is concerned with a novel combination of process steps whereby the entrained reforming catalyst fines are effectively and economically recovered from the product effluents for re-use.

An object of this invention is to provide a method of separating entrained catalyst fines from the flue gas of a regenerator in a reforming process.

Another object of this invention is to provide a novel combination of process steps whereby the catalyst fines entrained in the reaction product and flue gas of a regenerative hydroforming system are effectively and economically recovered for reuse in the process.

Other objects and advantages of this invention will become apparent from the following description and explanation thereof.

In accordance with the present invention, the gasiform effluent from the reforming zone comprised of gasoline, polymer, normally gaseous materials and entrained finely divided catalyst is passed to a separation zone wherein the polymer is separated as a condensed liquid, the condensed polymer is then used for scrubbing the catalyst from the gasiform effluent, at least a portion of the polymer is separated from the catalyst, at least part of the separated polymer condensate is then used to scrub the entrained finely divided catalyst from the regenerator effluent of the same system, and then at least a portion of the polymer is separated from the catalyst.

In a reforming system, the polymer constitutes the highest boiling normally liquid product, and it generally represents the product boiling above the gasoline product. The polymer has an initial boiling point which can vary a great deal, depending upon the end point desired for the gasoline. At present refiners are interested in 400° F. end point gasoline, however, this is subject to change in the future, hence, for the purposes of this invention, the initial boiling point of the polymer can vary from about 375° F. to about 425° F. The end point of the polymer is determined by the character of the feed, catalyst and reaction conditions, and so it also can vary over a wide range. For my purpose, the polymer includes all of the normally liquid product boiling above the desired gasoline product, therefore, the end point is not essential to establish its identification. The quantity of polymer produced can vary a great deal, however, for the most part, it comprises about 0.5 to about 8% by volume, based on the feed. The quantity of polymer produced can be higher or lower than the range specified, just so long as the same is made in the process, which is generally the case.

The reaction product which is processed in this invention has already been subjected to a separation treatment by means of centrifugal means, e. g., cyclones, and as a rule, it contains a relatively small quantity of entrained catalyst in the gasiform product. In commercial practice, the cyclones employed permit about 0.5 to 2% by weight of the catalyst charged to the system to be carried through and this catalyst consists of particles of relatively small size, in the order of about 0 to 40 microns. For this invention, the amount of catalyst entrained in the discharged reaction product can be substantially higher or lower, such as for example, about 0.01 to about 10 or 15% by weight, as the quantity of catalyst in the gasiform product is not critical for the operability of my process.

The flue gas produced in the regenerator is the product obtained by burning the carbonaceous material on catalyst with air or a suitable oxygen containing gas. This product contains nitrogen, carbon dioxide, little or no carbon monoxide, steam, and entrained catalyst. Usually, catalysts employed for reforming are excellent oxidation promoters, consequently, the combustion conditions are not favorable for the production of carbon monoxide. However, the present invention is applicable for processing flue gases containing significant amounts of carbon monoxide. The size of entrained catalyst and the quantity may fall in the ranges specified above for the reaction product.

In the practice of this invention, the gasiform reaction product containing entrained catalyst is treated to obtain the condensation of the polymer product. The polymer is to serve as the scrubbing means, because it is a cheap material and readily suitable for this purpose. The polymer containing catalyst is subjected to a separation treatment, which can be settling, to withdraw at least a portion of the polymer. The scrubbing step can involve large quantities of polymer relative to its net production in the reforming zone, and this is effected by maintaining a high re-circulation rate of scrubbed polymer, about 1 to 100 parts by volume per part of polymer produced. As a result of condensing the polymer product from reactor effluent, a relatively small but significant quantity of gasoline and lighter material is retained therein, and it is important for economical considerations to recover the product. In the preferred embodiment of this invention, the condensation of polymer is effected under a superatmospheric pressure, which favors the retention of more gasoline in the polymer, however, this practice is pursued for more important reasons. The temperature of the scrubbing step need only be sufficiently high to avoid the condensation of substantial quantities of gasoline to be used as scrubbing means. The pressure in the first scrubbing step is in about the same range as the reforming process.

Various techniques are proposed in this invention for the separation of gasoline and lighter components from the polymer which is substantially free of catalyst. In one method, the gasoline and lighter products are stripped by means of flue gas simultaneously as catalyst is being scrubbed from the flue gas. The temperature of the flue gas can be regulated to serve as a heat input means for use in stripping the gasoline, etc. from the polymer. A further aid in this treatment involves the use of a lower pressure than exists in the scrubber to obtain flashing of gasoline and lighter materials from the polymer. This general method may require control of the oxygen concentration in the flue gas, because concentrations of 1–2% or more may consume undesirable amounts of gasoline. The control of oxygen content in the flue gas can be effected by burning the same with a cheap fuel such as with the net make of normally gaseous product. Another method involves controlling the temperature of this scrubbing step in order to prevent burning of valuable product materials.

A second and preferred method of recovering gasoline and lighter material from the polymer is to conduct a flashing step for this purpose. The first scrubbing step is conducted at a superatmospheric pressure, and the separated polymer can be fed through an expansion valve into a flash tower. The gasoline and lighter material pass overhead as a vapor which is free of contamination, and the denuded polymer in a liquid state is yielded from the bottom thereof. This flashing zone is simple and effective. After the polymer has been flashed, it is then passed to a second scrubbing zone which is operated at any pressure desired for removing entrained catalyst from the flue gas. The flue gas exists usually at a superatmospheric pressure, and from the standpoint of tower cost, it may be desirable to operate at the same pressure in order to minimize the volume of flue gas being processed. On the other hand, the pressure in the scrubbing zone can be reduced from the level existing in the regenerator or the first scrubbing zone. The polymer does not contain valuable gasoline or lighter material, hence, less care can be exercised in preventing polymer loss in the flue gas. The temperature of the second scrubbing zone does have a bearing on the polymer loss. At high temperatures, as one would expect, there is a greater tendency for polymer to be vaporized into the flue gas stream than at lower temperatures. This flue gas temperature can be reduced by using its heat content to manufacture steam, and all or part of this steam can be used for stripping gasoline from the polymer which is yielded from the first scrubbing zone. Consequently, the polymer containing gasoline, etc., and which is substantially free of solids can be flashed at a reduced pressure in the presence of steam. The temperature in the second scrubbing zone can vary from about 100° F. to about 600° F. or 800° F., although when the flue gas is used to make steam, this temperature can be from about 150° F. to about 350° F. or to about 375° F., with or without auxiliary cooling, or even down to 100° F. to about 200° F.

The polymer used for scrubbing contains substantially all of the catalyst which was entrained in the flue gas. At least a portion of the polymer is separated from the catalyst, and this material may constitute the whole scrubbing medium or it can be a quantity which is more than is consumed in the scrubbing step, thus a net production of polymer is obtained. As in the first scrubbing zone, a large volume of polymer is circulated through the second scrubbing zone in contact with the flue gas. As a result of scrubbing, etc., little or no polymer is produced, hence, the relative quantity of flue gas to polymer circulated through the second scrubbing zone is about 500 to 20,000 standard cubic feet of flue gas (measured at 60° C. and 760 mm.) per barrel of polymer being circulated.

The catalyst recovered in the first scrubbing zone can be transported in the polymer as a slurry directly to the top of the reaction zone, or it can be mixed with the recovered catalyst from the second scrubbing zone which is to be returned or recycled to the reactor. In both instances, polymer serves as the slurry medium. In another alternative, the two streams can be sent to a settling tank or zone in which substantially all of the polymer is decanted off, and the remaining catalyst is slurried in fresh feed for recycle to any part of the reactor zone, preferably the bottom. This can also be accomplished by filtering, centrifuging, etc., however, the cheapest method is settling and decanting.

The catalyst employed in the present invention includes a large variety of materials which are known to possess properties for reforming light hydrocarbon oils. These catalysts have aromatization properties and include the metals, and/or oxides and/or sulfides of groups V, VI, and VIII of the periodic table. Specific examples of these catalysts are molybdenum trioxide-alumina, chromia-alumina, tungsten oxide-alumina, platinum-alumina, palladium-alumina, etc. This invention is especially adapted for a platinum catalyst supported on alumina by reason that it provides an economical and effective method for the removal of catalyst fines entrained in the effluent streams from the processing zones. Since platinum catalysts are expensive to manufacture, it is important to minimize the loss of catalyst, otherwise the process may be uneconomical in comparison with systems involving other types of reforming catalysts. Another type of reforming catalyst which can be used in the present invention is the heteropoly acid catalysts and these include, for example, phosphomolybdic acid, silicomolybdic acid, germanomolybdic acid, chromiomolybdic acid, vanadium molybdic acid, etc. All of the catalysts or catalytic elements described above are used either alone or supported on a carrier material such as, for example, zinc spinel, alumina, silica, magnesia, titania, zirconia, silica-alumina, alumina-magnesia, alumina-titania, bauxite, "Superfiltrol," alumina-thoria, charcoal, etc. The preferred support for the reforming process is the alumina material by reason that it provides a highly stable supporting medium and it is satisfactory in effecting the type of reaction desired. Generally, the catalytic element constitutes about 0.1 to about 50% by weight, more usually, about 0.5 to about 20% by weight, based on the total catalyst. In these catalysts, it is desirable to employ a small amount of silica, namely, in the range of about 0.1 to about 12% by weight, based on the total catalyst in order to enhance the stability of the catalyst at elevated temperatures. The alumina can be in the gel or activated form as either eta- or gamma-alumina or mixtures of the two.

The catalyst is employed in a finely divided form which is suitable for fluid systems. The catalyst has a size ranging from about 0 to about 250 microns, or more usually, about 10 to about 100 microns. The mass of finely divided particles is fluidized by the upward passage of reactant materials therethrough and the gaseous material can have a superficial linear velocity of about 0.1 to about 50 feet per second, although more usually, the velocity falls in the range of about 0.1 to about 6 feet per second. The superficial linear gas velocity of about 1.0 to about 2.5 feet per second provides a preferred dense fluidized mass for commercial operations in which the gas and solid particles are intimately associated. For the most part, the fluidized system involves a dense fluidized mass of particles situated in the processing vessels, namely, the regenerator or the reactor. In some cases, it may be desirable to operate the system such that the processing zones contain the fluidized catalyst as a lean phase or an intermediate phase between dense and lean phases.

The feed stock to be reformed by means of the present invention is a light hydrocarbon oil and includes, for example, gasoline, naphtha and kerosene. The light hydrocarbon oil can have an initial boiling point of about 85° to about 325° F. and an end point of about 300° to about 500° F. In the case of reforming a naphtha fraction, it is preferred to employ a naphtha having an initial boiling point of about 100° to about 250° F. and an end point of about 350° to about 450° F. Generally, the light hydrocarbon oil to be reformed has a Watson characterization factor of about 11.50 to about 12.20. The feed material can be one which is a straight run or virgin stock, a cracked stock which is derived from a thermal or catalytic cracking operation, or a mixture or blend of straight run and cracked stocks. Accordingly, the octane number of the feed material can be at least 5 CFRR clear, or more usually, about 20 to about 70 CFRR clear and the olefin content of the oil can vary from about 0 to about 30 mol percent. This light hydrocarbon oil can be derived from any type of crude oil, consequently, it can contain sulfur in the amount of 0 to about 3.0 percent by weight.

The light hydrocarbon oil is reformed under conditions which can involve the net consumption or net production of hydrogen. A system involving a net production of hydrogen is referred to herein as hydroforming, and it is operated under such conditions that the quantity of hydrogen produced is sufficient to sustain the process without the need for extraneous hydrogen. Generally, for the reforming of light hydrocarbon oils, a temperature of about 750° F. to about 1100° F. is employed. At this temperature, the pressure of the operation is generally maintained at about 25 to about 1000 p. s. i. g. The quantity of oil processed relative to the amount of catalyst employed is measured in terms of the weight space velocity, that is, the pounds of oil feed on an hourly basis charged to the reaction zone per pound of catalyst which is present therein. The weight space velocity can vary from about 0.05 to about 10. The quantity of hydrogen which is added to the process is usually measured in terms of the standard cubic feet of hydrogen (measured at 60° F. and 760 mm.) per barrel of oil feed charged to the reforming operation (1 barrel=42 gallons). On this basis, the hydrogen rate is about 500 to about 20,000 S. C. F. B. Another method of indicating the quantity of hydrogen which can be present during the reforming operation is by means of hydrogen partial pressure. In this regard, the hydrogen partial pressure is about 15 to about 950 p. s. i. a. in the reaction zone, based on inlet conditions.

In a hydroforming operation, the reaction conditions fall within the ranges specified hereinabove, however, they are selected on the basis of obtaining a net production of hydrogen. However, a preferred hydroforming process involves a temperature of about 850° F. to about 1050° F.; a pressure of about 50 to about 500 p. s. i. g.; a weight space velocity of about 0.1 to about 3; a hydrogen rate of about 1000 to about 7500 S. C. F. B. and a hydrogen partial pressure of at least about 25 p. s. i. a., and up to the point at which hydrogen is consumed.

Due to the reforming operation, the catalyst becomes contaminated with carbonaceous material which lowers its catalytic activity undesirably. Hence, the catalyst is subjected to a regeneration treatment which involves contacting the same with an oxygen containing gas, e. g., oxygen, air, diluted air having about 1 to about 10% by volume of oxygen at a temperature of about 600° to about 1200° F., preferably about 950° F. to about 1150° F. The regeneration is effected in the usual case at the same pressure which exists in the reaction zone in order to maintain an adequate pressure balance for the easy circulation of catalyst from one processing zone to another. Hence, the pressures specified hereinabove are also applicable for the regeneration phase of the process. Prior to regeneration, the spent catalyst can contain about 0.1 to about 5% of carbonaceous material on the catalyst and as a result of regeneration, the carbonaceous content can be reduced to zero content or up to about 0.5% by weight.

For a better understanding of the present invention, reference is had to the accompanying drawing which provides a specific embodiment thereof.

In the drawing, a naphtha fraction at the rate of 2000 barrels per day is fed from a supply source through line 5. A portion of the naphtha feed material can be diverted to flow through a valved line 7 for use as a slurrying medium for the circulation of recovered catalyst fines to the reaction zone. This will be explained in greater detail hereinbelow. The entire feed material or the remainder thereof flows through a line 9 which is connected to a feed pre-heat furnace 11. As a result of heating in furnace 11, the naphtha is vaporized to a temperature of about 935° F. The vaporized feed material passes from the furnace into a line 13, and thence, it enters the bottom part of the reaction zone by means of a distributor 15 situated therein. A fluidized bed 16 is maintained within the reaction zone. The reactor vessel 18 is a vertical, cylindrical vessel upon which there is super-imposed a stripper 19. The fluidized bed 16 is in a dense phase condition, and it has a density of about 35 pounds per cubic foot. The bed is shown as having a level 21. The amount of catalyst situated within the catalyst zone is sufficient to provide a weight space velocity of about 0.45 Wo./hr./Wc. The temperature of the reaction zone is maintained at about 930° F. and the total pressure is about 250 p. s. i. g. Recycle gas is introduced at the bottom of the fluid bed by means of a line 23 at the rate of about 5000 S. C. F. B. The recycle gas is introduced at a temperature of about 1350° F. in order to supply a substantial amount of the endothermic heat which is required for the reaction. Spent catalyst is withdrawn from the reactor bed 16 through a well 25, which depends from the bottom of the reactor 18. The spent catalyst is transported upwardly through a vertical, cylindrical riser 26, which originates in well 25 and has its terminus in the middle part of stripper 19. The spent catalyst is transported by means of recycle gas, which is first supplied through a line 28 and then it passes through a plug valve 30 situated within well 25. The recycle gas employed as the carrying medium for the spent catalyst exists at a temperature of about 750° F. The reaction product leaving the catalyst bed 16 contains entrained catalyst fines which are substantially separated therefrom and recovered by means of a cyclone separator 32. The separated catalyst is returned to the catalyst bed through dipleg 33 of the cyclone 32.

The spent catalyst flows into stripper 19 from the vertical riser 26, and it forms a dense fluidized mass having a level 35 in the stripper. Stripping gas, such as steam, is introduced into the bottom part of the stripper by means of a line 37 at a temperature of 850° F. The product from the stripper is circulated through a relatively short vertical riser 39, which interconnects the vapor or gas space in the stripper with the vapor space in the reaction vessel. In the event that the catalyst level becomes higher than is desired in the stripper, there is provided a conduit 40 which interconnects the stripper with the reactor for accommodation of the overflow. The stripped catalyst passes into a well 42 which communicates with a stripped catalyst standpipe 44. Standpipe 44 contains a slide valve 45 for automatically controlling the rate of catalyst passing therethrough. The catalyst is circulated through standpipe 44 at the rate of 8000 pounds per hour, thus providing a catalyst to oil ratio of about 0.4. The spent catalyst transfer line 44 is connected to the upper part of regenerator section 47. An enlarged, vertical disengaging section 49 superimposes section 47, and there is situated within this section a cyclone separator 51 for the purpose of separating entrained catalyst fines from the outgoing flue gas and returning the same to the regenerator section 47 by means of dipleg 52. A dense fluidized bed having a level 54 is maintained within regenerator section 47. Regeneration gas, air, is supplied at the rate of 3800 pounds per hour through a line 57 which is connected to the bottom end of section 47. The temperature of the regenerator is maintained at about 1100° F., and this temperature level is controlled by means of cooling tubes 58 which are situated within the catalyst bed in section 47. The pressure in the regenerator is approximately 260 p. s. i. g. Water is used as coolant for the cooling tubes 58, and it is supplied from a water drum 60, through lines 61 and 62. Steam and unvaporized water are discharged through line 63 and then they are returned to drum 60. A fresh supply of water is supplied to drum 60 by means of a line 64. The steam thus formed from the vaporization of water in the cooling tubes is discharged from the drum through a line 65. The regenerated catalyst is removed from the bottom part of the dense bed in the regenerator section 47 via a transfer line or standpipe 69. This standpipe contains a slide valve 70 for the purpose of automatically controlling the rate of catalyst flowing therethrough. The end of the standpipe is connected to a well 72 which is situated within the bottom part of reactor 18.

Reaction product containing entrained catalyst fines is discharged from the cyclone separator 32 through a discharge line 75. The reaction product is first passed through a heat exchanger 77 by which the temperature is decreased through indirect exchange of heat with the recycle gas flowing through line 79. The cooled reaction product is discharged from the exchanger 77 into a line 81, and then it flows into the bottom part of a scrubbing tower 83. Scrubbing tower 83 is composed of two sections, one being a scrubbing section in which there are situated baffles 85 and the other a fractionating section having suitable plates 87 for the fractionation of material flowing through this portion of the tower. The temperature in the bottom part of the scrubbing section below baffles 85 is maintained at about 420° F. and a pressure of about 240 p. s. i. g. As a result of these conditions, a condensed liquid including the polymer product having an initial boiling point of approximately 400° F. as well as some gasoline product and lighter boiling components is obtained. The condensate passes through a disc-shaped tray 89 and it is allowed to stand in a settler 90 which is associated with scrubbing tower 83. The slurry of polymer and catalyst is allowed to stand in settler 90 to form a supernatant liquid which is essentially free of catalyst fines. A portion of the polymeric product, about 1000 pounds per hour, is withdrawn from the settler 90 through a line 92, and it is then recycled by means of pump 93, through line 94 and into a cooler 95. The temperature of the polymer is first cooled to a temperature in the range of about 200° to about 250° F. and then it is recycled to the upper part of the scrubbing section by means of a line 96. The cooled polymeric material descends downwardly over baffles 85 in the scrubbing section and thereby it serves to scrub entrained catalyst fines from the ascending reaction product vapors and it selectively condenses substantially all the polymeric fraction therefrom. According to one method of operation, a slurry of catalyst fines is withdrawn from the bottom of the settler 90 through a line 98, and thence, it is passed through lines 99 and 100 before being transported by means of pump 102, through a line 103 and a valved line 104, which latter line is in turn connected to the reactor 18. It is also contemplated by means of this invention to withdraw a thick slurry of catalyst fines through line 98 and then this slurry is passed through a line 106 before entering an auxiliary settler 108. In this mode of operation, all of the recovered catalyst fines are passed through line 106. In the auxiliary settler a supernatant liquid polymer having a level 109 is withdrawn through a line 110. The settled solids having a level 111 are passed to a hopper 112 which depends from the main section of the settler. The solids are discharged through a valved line 113, and then they are combined with a portion of fresh feed in the amount of about 3000 pounds per hour, which is supplied through a line 115. The combined catalyst and fresh feed are passed through a line 116 which is connected to the suction line 100 of pump 102. The slurry of recovered catalyst fines and fresh feed can be returned to the reactor through line 104, or it can pass through a valved line 120 which in turn is connected with the line 13 carrying vaporized feed material.

The gasoline and lighter boiling product materials are yielded overhead from tower 83 through a line 125. The vaporous products are cooled and substantially condensed in a cooler 126 and then they are passed through a line 127 which is connected to the top of an accumulator 129. The condensed product is withdrawn from the bottom of accumulator 129 through a line 131, and thence, it is divided so that a portion passes through a valved line 132 as raw product material, and the other portion is passed through line 134, serving as the suction line of pump 135, and then it is recycled to the top of tower 83 through recycle line 136. The normally gaseous product materials are yielded overhead from accumulator 129 through line 140. The net production of normally gaseous product materials is yielded through a valved line 141; whereas about 18,500 pounds per hour of this material are passed through a line 143 which is connected to a liquid separator 145. Any entrained liquid in the gaseous material is removed from the bottom of the separator through a valved line 147; whereas the gaseous material passes overhead from the separator 145 into a line 149, and thence, it is fed to a compressor 141. The compressed gaseous product material passes through line 152 prior to entering a second separator 154 in which entrained liquid is collected and discharged through a valved line 155. The compressed gaseous product material is discharged overhead from separator 155 into line 79 which, as previously indicated, is connected to exchanger 77. The recycle gas acquires heat in the exchanger, and thence, it passes through a line 160. Line 160 leads to a line 28 and a heating element 161 in which the temperature of the recycle gas is raised to about 1350° F. The heated recycle gas is passed through a line 23 which leads to the reactor. The other portion of recycled gas passes through line 28 and it serves to carry spent catalyst upwardly through riser 26.

A portion of decanted polymer is withdrawn from settler 90 through a line 170 at the rate of about 3100 pounds per hour. This decanted polymer exists at a pressure of about 240 p. s. i. g., and thence, it is passed through an expansion valve 171 before passing into flash tower 173 via line 174. A pressure of about 85 p. s. i. g. in maintained in flash tower 173, and steam is introduced into the bottom part thereof by means of line 175 for the purpose of stripping out any gasoline and lighter boiling components which are retained in the polymeric product. The flashed or stripped gasoline and lighter boiling material are removed from the flashing tower by means of an overhead line 177. This flashed product is cooled by means of cooler 178 before it is passed to an accumulator 180 via line 181. The water which is condensed from the overhead product is removed through a bottom valved line 183 whereas the gasoline and lighter boiling materials are discharged from the accumulator by means of a line 185. The flashed or stripped polymer is removed from the bottom of flash tower 173 by means of a line 187, and then it is transported by means of pump 188 through a line 189, heat exchanger 191, and line 193. Line 193 is connected to the top of a flue gas scrubber 195 in which there are baffles 197. Flue gas containing entrained catalyst fines is introduced into the bottom part of the flue gas scrubber by means of line 199. The temperature in this flue gas scrubber is maintained at about 200° F. and a pressure of about 230 p. s. i. g. The polymeric material descending downwardly through the scrubber contacts the flue gas and scrubs therefrom the entrained catalyst fines. The polymer passes through a disc-like tray 201 which is situated in the bottom part of the scrubber, and thence, it enters a settler 203. The polymer containing catalyst fines is allowed to stand to produce a supernatant layer of polymer. This supernatant polymer is withdrawn through a line 205, and thence, it is transported by means of pump 206 through a line 207, cooler 208 and a line 209 which is connected to the top part of the scrubber. The decanted polymer is recirculated to the top of the scrubber at a rate of 500 pounds per hour and at a temperature of about 175° F. The net production of polymer is discharged through a valved line 211 which is connected to a line 205, previously mentioned. The flue gas, which is substantially free of entrained fines, is removed overhead through a valved line 214. A slurry of polymer is removed from settler 203 through a line 216, and then, it is transported through line 218 by means of pump 219. Line 218 divides into a valved line 221 which is connected directly to the middle part of settler 90 of scrubber 83 and a valved line 223 which is connected directly to line 98, which in turn is connected to the bottom of settler 90. Line 221 provides for the direct circulation of slurry from the flue gas scrubber to the product scrubber, and the entire mass can be allowed to stand in settler 90. Valved line 223 provides for the introduction of the slurry from the flue gas scrubber to the auxiliary settler 108.

The flue gas product from the regenerator is passed overhead through a line 230. This flue gas can contain a small amount of oxygen in the amount of about 0.1 to 3%. In the event that the flue gas scrubber is operated at an elevated temperature, e. g., above about 275° F., it may be desirable although not essential, to consume the excess oxygen by means of the product gas which is yielded through line 141 and it can be introduced through line 231. The flue gas can be introduced directly from line 230 to the flue gas scrubber. However, since the temperature of the flue gas is quite high and the heat contained therein can be utilized economically, it is preferred to pass the same through a steam generator shown schematically as 233. The steam generator receives its water supply from drum 60, through a line 235, and the heated water and steam which are thus formed are recycled to drum 60, via line 236. By reason of the two sources of steam supply, the net production of steam is yielded through a valved line 238. About 100 pounds per hour of this steam is passed through line 175, which is connected to the bottom of flash tower 173. The flue gas leaves the generator 233 at a temperature of 400° F., and in the preferred embodiment, this temperature is reduced by means of a suitable cooler 240 such as, for example, a water cooler, to a temperature of about 210° F. The cooler 240 is connected to generator 233 by means of a line 241. The cooled flue gas leaves the cooling means 240, and it flows through line 199 which leads to the bottom of flue gas scrubber 195.

Having thus provided a description of this invention, it should be understood that no undue limitations or restrictions are to be imposed by reason thereof, but that the present invention is defined by the appended claims.

I claim:

1. In a fluidized catalyst process for the reforming of light hydrocarbon oils and regeneration of contaminated catalyst wherein vaporous reaction effluents are formed in the conversion and regeneration zones containing entrained catalyst fines, the improvement which comprises separating a liquid fraction from the vaporous conversion effluent, scrubbing vaporous effluent from the conversion zone with a portion of the liquid fraction thus separated to remove entrained catalyst fines, flashing a portion of the liquid fraction previously used for scrubbing vaporous effluent from the conversion zone to form a low boiling fraction and a high boiling fraction, scrubbing vaporous effluent from the regeneration zone with the aforesaid high boiling liquid fraction to remove catalyst fines and recycling the aforesaid recovered catalyst fines to the reaction zone.

2. The process of claim 1 wherein the liquid fraction is flashed in the presence of steam.

3. A reforming process which comprises contacting a light hydrocarbon oil feed material with a finely divided reforming catalyst in a fluidized reaction zone under conditions to produce a vaporous reaction mixture containing polymer, gasoline, normally gaseous product material and entrained catalyst fines whereby the catalyst becomes contaminated with carbonaceous material, regenerating contaminated catalyst by combustion of said carbonaceous material with an oxygen-containing gas to produce a flue gas containing entrained catalyst fines, separating a liquid fraction including polymer and gasoline from the vaporous reaction mixture, in a first scrubbing step scrubbing vaporous reaction mixture with a portion of the liquid fraction thus separated to remove entrained catalyst fines, separating catalyst fines from the scrubbing liquid of said first scrubbing step, flashing a portion of the liquid fraction to separate gasoline from polymer in a second scrubbing step scrubbing flue gases containing entrained catalyst fines with polymer thus separated from gasoline, separating catalyst fines from the polymer used in said second scrubbing step and recycling the recovered catalyst fines to the reaction zone.

4. The process of claim 3 wherein the liquid fraction is flashed in the presence of steam to strip substantially all of the gasoline from the polymer.

References Cited in the file of this patent

UNITED STATES PATENTS

| | | |
|---|---|---|
| 2,378,342 | Voorhees et al. | June 12, 1945 |
| 2,449,095 | Wheeler et al. | Sept. 14, 1948 |
| 2,450,753 | Guyer | Oct. 5, 1948 |
| 2,663,676 | Cardwell et al. | Dec. 22, 1953 |
| 2,665,239 | Howard et al. | June 5, 1954 |